Oct. 15, 1968   B. WEIRAUCH   3,405,750
APPARATUS FOR THE TREATMENT OF BEANS AND THE LIKE
Filed Sept. 6, 1966   2 Sheets-Sheet 2
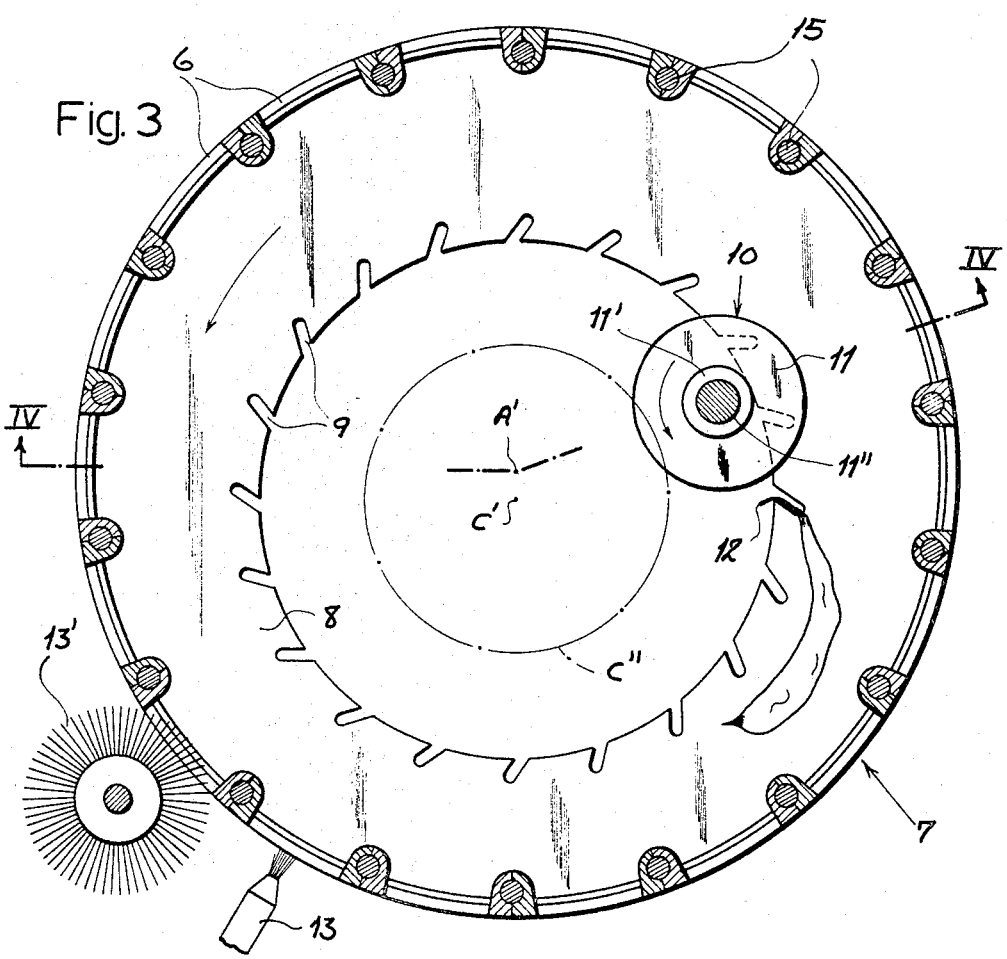
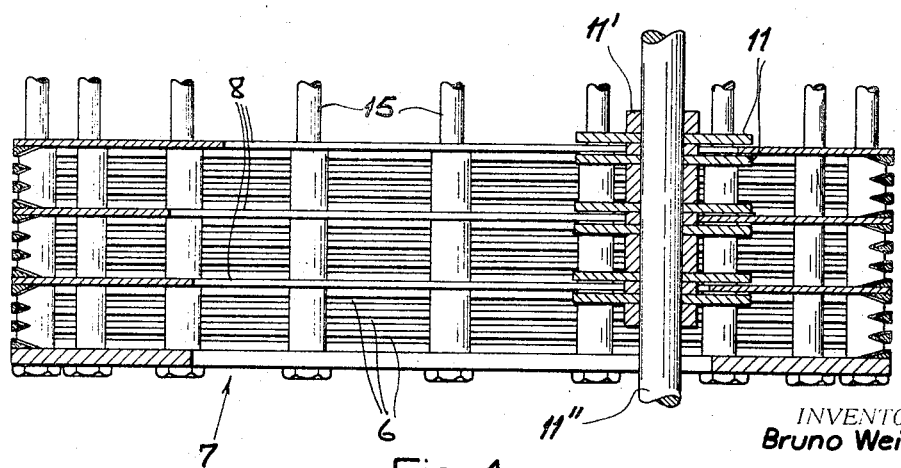
INVENTOR:
Bruno Weirauch
BY
Karl J. Ross
Attorney

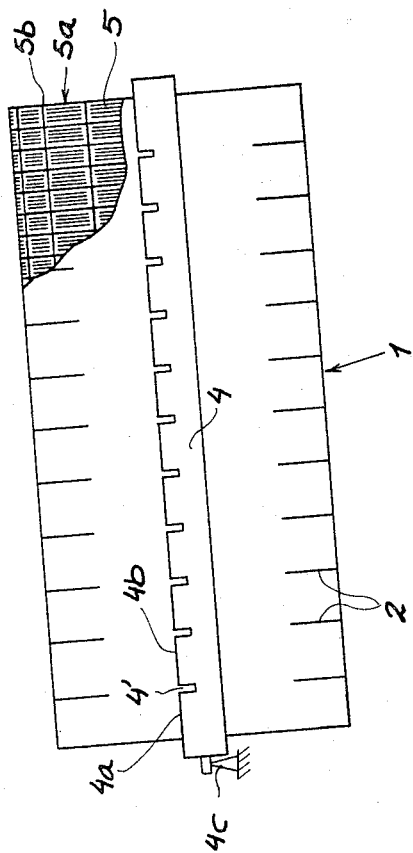
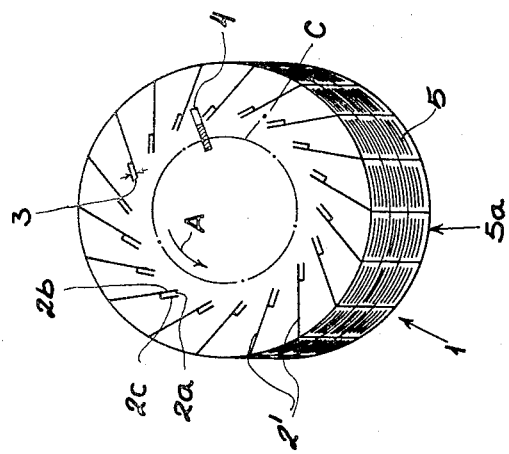

United States Patent Office 3,405,750
Patented Oct. 15, 1968

3,405,750
APPARATUS FOR THE TREATMENT OF BEANS
AND THE LIKE
Bruno Weirauch, Braunschweig, Germany, assignor to Maschinenfabrik August Herbort K.G., Braunschweig, Germany, a corporation of Germany
Filed Sept. 6, 1966, Ser. No. 578,202
Claims priority, application Germany, Sept. 15, 1965,
M 66,639
10 Claims. (Cl. 146—1)

My present invention relates to apparatus for the processing of string beans, green beans and other pod vegetables and especially to the treatment of bush-grown beans and the like harvested by combines and other automatic picking and harvesting equipment.

In the commonly assigned copending application Ser. No. 494,167, filed Oct. 8, 1965, there is described an improvement in the preparation of pod vegetables, such as peas and beans, and an apparatus for the processing thereof prior to the slicing, cooking or other treatment thereof. In that application, it is pointed out that bean pods, which are to be severed, must be freed from the stems or stalks which would interfere with the slicing operation. Prior to the use of apparatus of the type described in this copending application, it was the practice to remove the stems, stalks and spikes from the pods by hand or to remove stem-carrying pods from the batch to be processed so that the processing could proceed without the interference mentioned earlier. The improved method involves the tumbling of the pods in a drum having a generally level but somewhat inclined axis and provided with a multiplicity of through-going slots of a width less than that which would permit the pods to pass but sufficient to permit the stems and stalks to protrude therethrough, and the shearing, adjacent the outer surface of the drum, of the stem and stalk portions extending outwardly therebeyond through the slits. Thus the apparatus according to the previously mentioned copending application, comprises a drum having a multipli-slot imperforate periphery whose slots preferably extend in the direction of rotation of the drum or are inclined thereto. According to an important feature of that disclosure, the walls of the slots converge outwardly, i.e. from the inner surface of the drum to the outer surface, so that the ends of the pods carrying the stem and stalk portions become nested between the converging flanks of a respective slot while the stem or stalk portion projects therebeyond. The severing operation is preferably carried out by one or more blades juxtaposed with the outer drum surface along the rotation path thereof and preferably along the underside of the drum. The blade means can be constituted as a multiplicity of staggered blades adapted to intercept all of the stems protruding through the slots of the drum as well as any tips of the pods (usually remote from the stalk portion) which may project therethrough.

Still another important feature of that system is the provision of a multiplicity of generally rectangular cylinder-arc segments which are disposed in contiguous relationship and define the periphery of the tumbling drum, each of these segments being formed with a plurality of throughgoing slots of the configuration mentioned above. These slots, which preferably extend the full length of the respective arc segments, may be parallel to one of the longitudinal edges thereof or inclined thereto as mentioned earlier. The rectangular segments may be held in place by a multiplicity of tension rods extending along generatrices of the drums and davantageously securing the periphery of the drum (made up of these segments) to front and rear drum walls of disk configuration. Best results are obtained when the axis of the drum is not precisely horizontal, as mentioned earlier, but is inclined slightly downwardly.

It will be apparent that the apparatus and the method of the character described, as set forth in the commonly assigned application Ser. No. 494,167, may encounter difficulties when the stalks, stems and other projecting elements of the pods do not have free ends extending therefrom. Such is the case, for example, when mechanically harvested bush-grown beans are collected in large quantities inasmuch as many of the bean pods are joined together with others as twins or triplets so that the stalks connect two or more pods and cannot readily be severed from the pod by the apparatus or method described earlier.

In order to facilitate the destemming of bush-grown and mechanically harvested pod crops, it is necessary either to separate the twinned or triplet pods by hand or to provide special apparatus for this purpose. Thus it has been proposed to use, for such crops, a destemming machine for such crops whose inner wall is provided with lifting elements for carrying the pods against stationary separating combs or blades whereby the stems interconnecting the pods can be broken. These lifting elements are generally fingers upstanding from the inner periphery of the drum which engaged the stems connecting paired pods, for example, and lift them against the separating combs. Such fingers are only satisfactory, however, when the paired pods form a V or angular junction since otherwise the product tends to fall from the fingers and the efficiency of the separation of the pods is sharply reduced. Furthermore, unpaired or nonmultiple pod arrangements do not approach the separating comb at all and thus are not freed from their stems.

It is, therefore, the primary object of the present invention to extend the principles originally set forth in the commonly assigned copending application Ser. No. 494,-167 to a destemming machine capable of effectively separating multiple pod accumulations.

A further object of this invention is to provide a device for the destemming and separation of twinned and other multiple-pod accumulations in a highly efficient and rapid manner and regardless of the configuration of the junction between the pods.

These objects and other which will become apparent hereinafter are attained, in accordance with the present invention, by providing in a destemming device having a tumbling drum and preferably a blade arrangement as set forth in application Ser. No. 494,167, a multiplicity of lifting elements within the interior of the drum having inwardly open slots distributed generally uniformly over the inner periphery of the drum and of a width corresponding approximately to the diameter or thickness of the bean stems, stalks or spikes which it is desired to remove, the slots being disposed in planar arrays axially spaced along the drum and co-operating with a separating comb which is interfitted with the arrays of slots to sever the beans, whose stalks are entrained in the respective slots, from their stems. The stem-grasping slots of these arrays are turned inwardly as indicated earlier and can be generally radial although it is preferred that the stems turn inwardly in the direction of rotation of the drum so that they are more or less tangential to a circle centered on the axis of the array but having a diameter less than that of the respective array.

The arrays can be constituted from peripherally spaced elements of bifurcated configurations so that forked shanks define the slots between them although it has been found to be preferable when the array is constituted as an angular disk whose inner periphery is slotted at angularly spaced locations with the slots turned inward in the direction of advance of the drum. Disks of this type can be manufactured without difficulty and at relatively low cost and also serve as internal stiffeners for the drum which is advantageously composed of cylindrical segments and tie rods as set forth in application Ser. No. 494,167. The disks may, moreover, be eccentrically mounted in the drum. In fact, reenforcing and stiffening disks have been provided in prior tip-removal and destemming devices using tumbling drums and I have now found it to be most convenient to provide these very disks with the respective arrays of slots along their inner peripheries and to mount the separating comb within the interior of the drum for co-operation with these disks. In this manner, a highly efficient separation of multiple pod accumulations and an excellent overall destemming and tip-severing action can be obtained in a single pass of the crop through the tumbling drum. With this type of modification, ten tip-severing machines requiring substantially sixty workers for destemming and separating of multiple pods need only about ten to fifteen workers with substitution of the new machine. The separating comb, according to the invention, can be of the blade type provided with slots between respective blades through which the disks or arrays of forks pass in interleaved relationship or may be constituted as a multiplicity of axially spaced cutting wheels mounted upon a common shaft and whose blades flank the disk or array of forks.

The above and other objects, features and advantages of the present invention will become more readily apparent from the following description, reference being made to the accompanying drawing in which:

FIG. 1 is a front-elevational view of the inclined tumbling drum of a destemming apparatus in accordance with the present invention;

FIG. 2 is a side-elevational view of this drum, partly broken away, in diagrammatic form;

FIG. 3 is an axial cross-sectional view through a preferred destemming tumbler; and FIG. 4 is a cross-sectional view taken along the line IV—IV of FIG. 1.

In FIGS. 1 and 2, I show a tumbling drum, generally designated 1, and preferably constituted with peripheral slots 5 in respective cylindrical segments 5a held together by tie rods 5b connecting the cylindrical drum portions with end disks in the manner described and illustrated in application Ser. No. 494,167 discussed above. The cylindrical periphery of the drum 1 co-operates with a multiplicity of staggered blades as also set forth in this copending application, to sever protruding stems and tips of the bean pods, when these portions pass through the slots 5. Within the interior of the drum 1, I provide a plurality of arrays 2, axially spaced along the drum and circumferentially extending thereover in respective planes perpendicular to the drum axis, of individual forks 2' spaced peripherally about the drum in the respective arrays 2. The bifurcated inner extremity of each fork 2' has a slot 2a defined between a pair of shanks 2b, 2c also in the plane of each fork array. The width 3 of each slot 2a corresponds approximately to the thickness of the bean-pod stems or stalks and the slots 2a are oriented so that they turn inwardly towards the drum along tangent to an imaginary circle C of each array centered thereon, and in the direction A of rotation of the drum. In other words, the slots 2a are turned away from the interior of the drum in the sense counted to the rotational direction thereof. In the first (right-hand upper) quadrant of the drum, I provide a separating comb 4 whose slots 4' receive the individual arrays 2 of forks as they sweep past this comb with the separating portions 4a and 4b, flanking the respective array, breaking the stems entrained by the forks. Thus the arrays 2 of fork are interleaved with the separating comb 4 which is fixed within the interior of the drum by means not illustrated in detail but represented as the support 4c. It will be evident that the forks 2' engage the narrow stems, stalks or spikes of the bean pods whether they connect a pair of such pods in a twinning group or are only secured to the individual bean and carry the pods so that they are broken away from the stem at the separating comb 4. The broken-off stems or stalks pass through the slots 5 and the residual stem portions upon the bean pass in a similar manner through these slots for removal by the external blades as described in copending application Ser. No. 494,167.

In FIGS. 3 and 4, I show a modified drum 7 of the tip-severing type which is provided with slots 6 through which the tips of the beams and any residual stalk portions may emerge for severing by external blades as described in the copending application mentioned above. In the interior of the drum, there is provided an axially spaced locations a plurality of annular disks 8 which are connected together by the tie rods 15 holding the cylindrical segments in the cylindrical array. The slots 6 converge outwardly from the interior of the drum which has an axis of rotation A'. The disks 8 are, however, eccentric so that their centers of roation C' are staggered with respect to one another and are offset from the axis A' of the drum. The disks are provided along their inner periphery with respective arrays of slots 9 which also are generally tangent to an imaginary circle C'' centered upon the axis C' of the respective array. The slots 9 are staggered angularly from one disk to the next and have widths corresponding to the thickness of the beam stalks or stems. Interleaved with the axially offset arrays 8 of slots 9 are the cutting disks 11 of the separating comb. The disks 11 flank each annular disk 8 and are carried by a spacer 11' which is freewheeling upon a shaft 11'' or keyed thereto so that it can be driven independently of the annular disks 8. Thus the assembly 11, 11' and 11'' forms a comb in the upper righthand quadrant of the drum which interfits with the stalk-grasping slots and their arrays for severing these stalks close to the bean pod. A jet 13 of a liquid or a brush arrangement 13' can be provided adjacent the periphery of drum 17 as illustrated in FIG. 3. When a bean pod within the drum has lodged in the slots 6 so that its tip emerges therefrom, the external blades (see application Ser. No. 494,-167) sever the tip and any residual stem portion. Stems 12 of a bean pod which are grasped by slots 9 are entrained upwardly until the stems are broken from the pods by the separating comb 11, 11' and 11'', the comb arrangement being designated more generally at 10. When the drum is operated at high rate and provided with a relatively large number of separating disks at 10 and interengaging disks 8, in relatively short order substantially all of the stems and stalk portions are severed into relatively small fragments. Bean pods or their stalks which lodge in the slots 6 are released therefrom by the brush 13' or the jet 13 of high-pressure liquid so that the beans again enter the drum and may continue the tumbling action until they emerge at the base thereof.

The invention described and illustrated is believed to admit of many modifications within the ability of persons skilled in the art, all such modifications being considered within the spirit and scope of the appended claims.

I claim:
1. In a destemming apparatus for removing stems from pod vegetables or separating vegetable pods having a branched connection, the improvement which comprises:
   a pod-tumbling drum rotatable about an axis for receiving the pods;
   a plurality of axially spaced arrays of coplanar slots provided on the interior of said drum and opening inwardly thereof in the direction of rotation of said drum, said slots having widths approximately equal to the thicknesses of the stems of said pods for engaging said stems and entraining them along an arcuate path; and
   separating-comb means in the interior of said drum along said path and interleaved with said arrays for breaking the stems entrained in said slots upon rotation of said drum and the displacement of the entrained pods past said separating-comb means.

2. The improvement defined in claim 1 wherein each of said slots is formed in a respective fork and each of said arrays consists of a multiplicity of such forks peripherally spaced about the interior of the drum and extending inwardly from the wall thereof, said forks each having a pair of shanks lying in the plane of the respective array forming the respective slots between them.

3. The improvement defined in claim 1 wherein each of said arrays of slots is provided in a respective annular disk fixed to said drum and lying a plane perpendicular to the axis thereof, said slots opening and the inner periphery of said disk.

4. The improvement defined in claim 3 wherein said apparatus is a bean-pod detipping machine and said disks are the annular reinforcing ribs thereof.

5. The improvement defined in claim 1 wherein said separating-comb means is a bar extending within said drum and having a plurality of notches each receiving a respective array.

6. The improvement defined in claim 1 wherein said separting-comb means is constituted with a plurality of separating disks rotatable about a common axis generally parallel to the axis of said drum with each of said arrays being flanked by a pair of said disks.

7. The improvement defined in claim 1 wherein said drum is provided with slits for passing the severed stems extending in lines generally parallel to one another.

8. The improvement defined in claim 7 wherein said slits extend circumferentially about said drum.

9. The improvement defined in claim 1, further comprising means directed against the exterior of said drum for displacing material thereon generally inwardly.

10. The improvement defined in claim 1 wherein said slots lie along tangents to a circle whose diameter is less than that of the respective array.

References Cited

UNITED STATES PATENTS

| | | | |
|---|---|---|---|
| 2,943,629 | 7/1960 | Carruthers | 130—30 |
| 3,010,498 | 11/1961 | Carlson | 146—86 |
| 3,059,648 | 10/1962 | Burton | 146—1 X |

JAMES M. MEISTER, *Primary Examiner.*